US012763044B2

(12) United States Patent
Juarez Salas

(10) Patent No.: US 12,763,044 B2
(45) Date of Patent: Oct. 13, 2026

(54) RECORDER OR DULCE FLUTE

(71) Applicant: Joaquin Juarez Salas, Estepa (ES)

(72) Inventor: Joaquin Juarez Salas, Estepa (ES)

( * ) Notice: Subject to any disclaimer, the term of this patent is extended or adjusted under 35 U.S.C. 154(b) by 206 days.

(21) Appl. No.: 18/427,633

(22) Filed: Jan. 30, 2024

(65) Prior Publication Data

US 2024/0265894 A1 Aug. 8, 2024

(51) Int. Cl.
*G10D 7/03* (2020.01)
*G10D 9/06* (2006.01)

(52) U.S. Cl.
CPC ................. *G10D 7/03* (2020.02); *G10D 9/06* (2013.01)

(58) Field of Classification Search
None
See application file for complete search history.

(56) References Cited

U.S. PATENT DOCUMENTS 3,224,315 A * 12/1965 Guinness ................. G10D 7/03 84/400
3,438,298 A * 4/1969 Thompson ............... G10D 7/03 D17/10
2010/0031801 A1* 2/2010 Montemurro ............ G10D 9/06 84/400
2014/0190332 A1* 7/2014 Winquist ................. G10D 9/06 84/384
2018/0033415 A1* 2/2018 Yonezu .................... G10D 9/06
2018/0204547 A1* 7/2018 Francisco Jose ........ G10D 7/03

FOREIGN PATENT DOCUMENTS

JP 2013137481 A * 7/2013

OTHER PUBLICATIONS

DeLong Anne, "Make your own recorder mute," retrieved on May 20, 2013 from https://web.archive.org/web/20130520031303/https://annedelong.timetraces.ca/recorder_mute.htm , 2013, (Year: 2013).*
Mugcheck, "Sordinella Recorder Mute," retrieved from https://www.youtube.com/watch?v=Bdg9Rua-rVs, published on Feb. 15, 2009, 2009, (Year: 2009).*
Espacenet, "Machine Translation of Application JP2013137481," (Year: 2013).*

* cited by examiner

*Primary Examiner* — Eduardo Castilho
(74) *Attorney, Agent, or Firm* — John Alumit

(57) ABSTRACT

A recorder, comprising a head (1) with a mouthpiece (2) suitable for blowing air and a bevel (3) with a window (4) for connection to an inner duct located adjacent to the edge (3.1) of said bevel (3), where the window (4) is capable of allowing adjustment of the tab (5) of a mute (6) that has removable connection means (7) around the head (1), characterized in that it comprises a rim (8) formed by two circumferential arcs (9) that respectively emerge from one of the sides of the window (4) and are arranged symmetrically along at least part of the contour of the window. head (1) in a section thereof located in the transverse plane that contains the edge (3.1) of the bevel (3), and where said rim (8) is capable of allowing the support of the removable connection means (7) of the mute (6) on it.

4 Claims, 3 Drawing Sheets

RECORDER OR DULCE FLUTE

CROSS-REFERENCE TO RELATED APPLICATION

Figure 1:
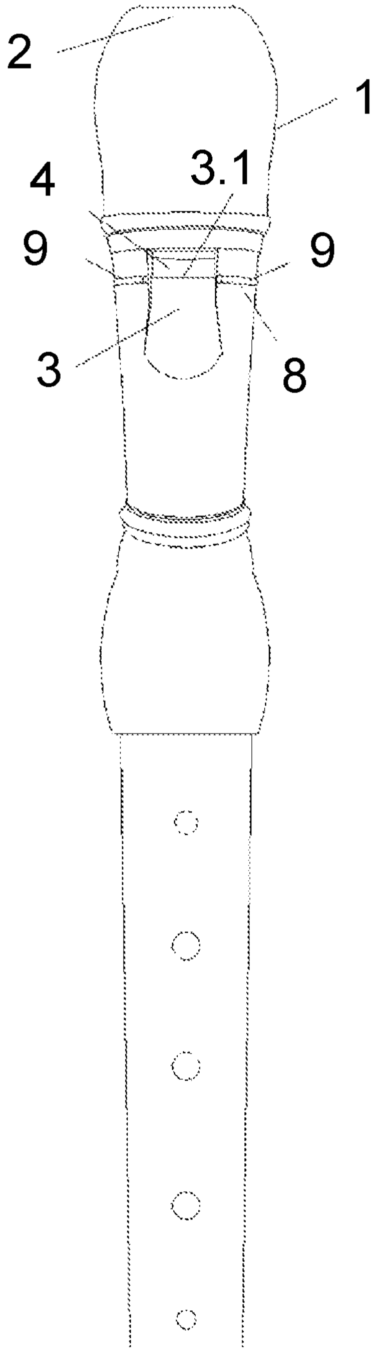

This present application claims priority to European patent application no. ES202330179U-2023-02-06 filed on Feb. 6, 2023.

FEDERALLY SPONSORED RESEARCH

Not Applicable

Sequence Listing or Program

Not Applicable

BACKGROUND

The present invention corresponds to the technical field of musical instruments, specifically to a recorder in which it is possible to place a mute for total or partial soundproofing thereof.

The recorder or recorder is a wind instrument made up of a tubular body with eight holes, as well as a bevel with a window connected to the central hollow space. The sound is generated when the performer blows through the mouthpiece of the flute and the air hits the bezel. With the fingers the holes are covered or uncovered to obtain the different musical notes.

It is an instrument that is very easy to learn to play without requiring great musical knowledge, and that is why it is an ideal instrument to start in the world of music, even at an early age.

This generates that in most schools it is the instrument chosen by music teachers to introduce schoolchildren in the handling of a musical instrument.

Most instruments, although not all, have mechanisms to reduce their sound, trying to alter its quality as little as possible, as well as the tuning of the instrument.

Some more modern instruments, such as the electric guitar or the clavinova, have a mechanism to raise or lower its sound, but the more traditional instruments require an external element, such as a mute, in the case of wind instruments, which makes it possible to achieve this objective.

The recorder does have a mute designed to reduce its sound without affecting its quality. This instrument has a fairly sharp sound so, taking into account note that high-pitched sounds go through walls much more easily than low-pitched sounds, and given the number of schoolchildren who spend their afternoons constantly rehearsing the songs their teachers tell them to, muting is a fundamental element for greater peace of mind for parents and neighbors.

The mute is an element that, depending on its position, allows you to reduce the sound between 70% and 80%, or even soundproof the flute by 97%, that is, even if you find out how you are playing, practically nothing sounds.

This is very advantageous for music classes, because while a student plays his flute in front of the teacher, the others can continue rehearsing practically without disturbing, but without stopping listening to what they are playing.

The mute of the recorder has a tab that is inserted into the window of the flute, covering the bezel sufficiently so that the arrival of air into it is considerably reduced, thus reducing the sound of the flute, without actually canceling it out. complete.

This mute has removable connection means around the head of the flute, in such a way that they form two bands in the shape of an arc that hug the head at the height of the window, when the tab is inserted into it.

The removable connection means of the mute embrace the flute in its contour but do not present any fixation with respect to the longitudinal axis of the flute, which generates a certain play of movement of the mute in said direction.

In practice, this is quite uncomfortable for the user who is playing the flute, because due to its own movement or due to the passage of air that impacts the flange, it generates a small turn of the mute that translates into a movement according to the direction length of the flute.

The problem is that with this game of movement, the mute is dislodged from the soundproofing position, since turning the tab allows a greater passage of air towards the bevel.

This translates into failures in the mute's soundproofing function and the person playing the flute must constantly reposition the mute, which is very annoying and prevents them from concentrating on the score.

It is therefore necessary to find a way to be able to soundproof the flute by means of a mute in a completely efficient way and without affecting the user by creating discomfort during use.

SUMMARY

The recorder presented here comprises a head with a mouthpiece suitable for blowing air and a bevel with a connection window to an internal duct located adjacent to the edge of said bevel. The window is capable of allowing adjustment of the flange of a mute that has removable connection means around the head of the flute.

This flute comprises a rim formed by two circumferential arcs that respectively emerge from one of the sides of the window and are arranged symmetrically along at least part of the contour of the head in a section of the same located in the transverse plane that contains the edge of the bevel.

This rim is capable of allowing the support of the removable connection means of the mute on it.

With the recorder proposed here, a significant improvement in the state of the art is obtained.

This is so because a flute is achieved that has a rim that acts as a support or support for the connection means of the mute when it is coupled to the flute.

By forming a support for the connection means, it keeps them fixed in their position, avoiding the up-down rocking that they present, so that the mute is well attached and no longer moves with respect to its position.

The mute has two possible positions, a first position with the tab closest to the edge of the bevel, which allows partial soundproofing, and a second position with the tab slightly separated from the bezel. One or the other position is achieved simply by turning the mute so that the offset that the tab presents with respect to the central transversal plane of the connection means, allows both positions of the tab.

According to this aspect, the flange that this flute presents allows the support of the mute connection means in both positions, so that the mute continues presenting its functionality but improved.

The support or support generated by said flange for the mute connection means keeps it fixed in its partial or total soundproofing position, so that even if the user moves it with his finger, it returns to its correct position.

In this way, efficient operation of the mute is ensured in any of its two possible positions and at the same time it is achieved that the use of the mute by the interpreter is comfortable and simple, without undesirable displacements of the mute.

It is therefore a very effective solution to ensure that the mute behaves correctly and achieves total or partial soundproofing of the flute, preventing the user from having to continually reposition it.

DRAWINGS

In order to help with a better understanding of the characteristics of the invention, according to a preferred example of practical embodiment thereof, a series of drawings is provided as an integral part of said description where, for illustrative and non-limiting purposes, represented the following:

FIG. 1.—Shows a perspective view of a recorder or recorder, for a preferred embodiment of the invention.

Figure 2:
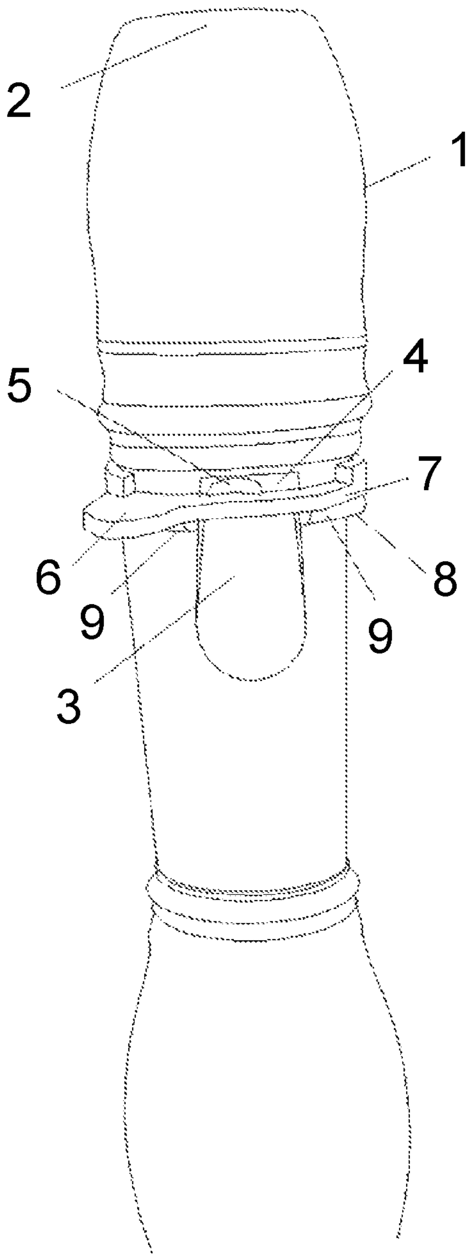

FIG. 2.—Shows a perspective view of a recorder or recorder with a mute in a first position thereof, for a preferred embodiment of the invention.

Figure 3:
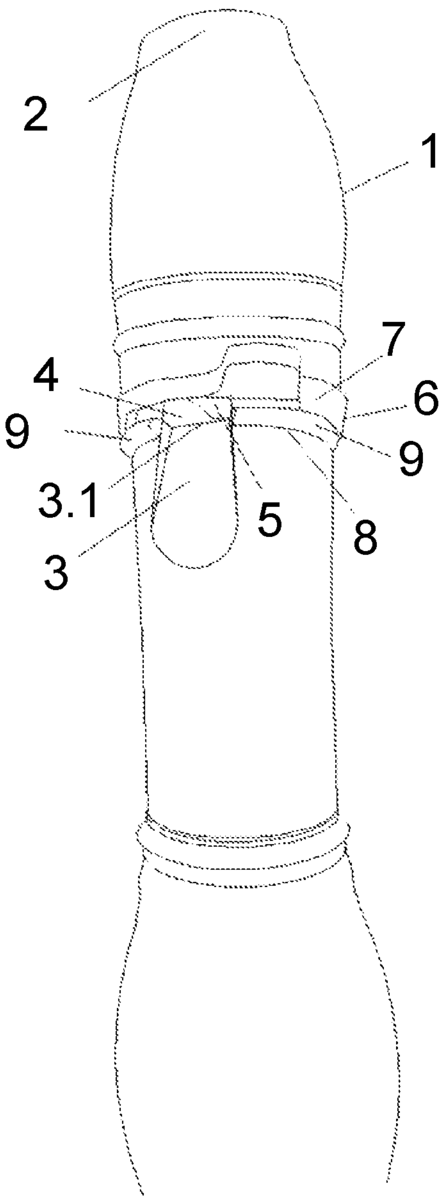

FIG. 3.—Shows a perspective view of a recorder or recorder with a mute in a second position thereof, for a preferred embodiment of the invention.

DESCRIPTION

In view of the figures provided, it can be seen how in a preferred embodiment of the invention, the recorder or recorder proposed here, comprises a head (1) with a mouthpiece (2) suitable for blowing air and a chamfer (3) with a window (4) for connecting to an inner duct located adjacent to the edge (3.1) of said chamfer (3).

This flute has window (4) that is capable of allowing adjustment of the tab (5) of a mute (6) that has removable connector (7) around the head (1) of the flute.

As shown in FIG. 1, this flute comprises a rim (8) formed by two circumferential arcs (9) that respectively emerge from one of the sides of the window (4) and are arranged symmetrically along at least one part of the contour of the head (1) in a section thereof located in the transverse plane that contains the edge (3.1) of the bevel (3).

This rim (8) is capable of allowing the support of the removable connector (7) of the mute (6) on it, as can be seen in FIGS. 2 and 3, in which a mute (6) is represented, adjusted in a first position of partial soundproofing and a second position of total soundproofing respectively.

In both cases, the removable connector (7) of the mute (6) are supported on the rim (8) which will thus limit the possible play of up-down movement of the removable connector (7), so that so that they ensure that the mute (6) will remain fixed in the right place without possible displacements that could reduce the effectiveness of its operation.

In this preferred embodiment of the invention, both circumferential arcs (9) that make up the rim (8) have a length of less than half the circumferential arc of the section, which runs from one side of the window (4) to the opposite side, however in other preferred embodiments both arches (9) can be joined, such that the rim (8) covers the entire contour of the section from one side of the window (4) to the opposite side of the same.

What is claimed:

1. A recorder with a mute (6) comprising a removable connector (7), and a rim (8) that supports the removable connector, said removable connector and rim provided for preventing dislodging of the mute from its soundproofing position, said rim is formed by two circumferential arcs (9) that respectively emerge from each side of a window (4) of the recorder, and said arcs are arranged symmetrically along at least one part of the contour of the head (1) of the recorder in a section located in a transverse plane that contains an edge (3.1) of a bevel of the mute (3);

said removable connector embraces the flute in a contour of the flute but does not present any fixation with respect to the longitudinal axis of the flute, thereby generating a play of movement of the mute along the longitudinal axis of the flute; and said rim embraces the head of the flute at a window of the recorder when a tab (5) is inserted in the window.

2. The recorder with a mute of claim 1, wherein each of the two circumferential arcs of the rim has a length of less than half the circumferential arcs of the section, said circumferential arcs of the rim each run from one side of the window (4) along a circumferential arc of the rim to the opposite side of the window.

3. The recorder with a mute of claim 1, wherein the two circumferential arcs of the rim are joined such that the rim (8) covers the entire contour of the section from one side of the window (4) to the opposite side of the window.

4. The recorder with a mute of claim 1, wherein the rim is disposed below the the mute.

* * * * *